United States Patent
Hodson et al.

(10) Patent No.: US 8,266,602 B2
(45) Date of Patent: Sep. 11, 2012

(54) APPARATUS AND METHOD FOR CONVERTING BETWEEN DEVICE DESCRIPTION LANGUAGES IN A PROCESS CONTROL SYSTEM

(75) Inventors: William R. Hodson, Telford, PA (US); Prasad Samudrala, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1407 days.

(21) Appl. No.: 11/444,044

(22) Filed: May 31, 2006

(65) Prior Publication Data

US 2007/0282463 A1    Dec. 6, 2007

(51) Int. Cl.
*G06F 9/45* (2006.01)
*H04J 3/22* (2006.01)

(52) U.S. Cl. ........................ 717/137; 370/466
(58) Field of Classification Search ............. 717/137
See application file for complete search history.

(56) References Cited

U.S. PATENT DOCUMENTS

| | | | |
|---|---|---|---|
| 5,923,557 A * | 7/1999 | Eidson | 700/129 |
| 6,437,692 B1 * | 8/2002 | Petite et al. | 340/540 |
| 6,847,316 B1 * | 1/2005 | Keller | 341/106 |
| 7,650,425 B2 * | 1/2010 | Davis et al. | 709/238 |
| 7,675,935 B2 * | 3/2010 | Samudrala et al. | 370/466 |
| 7,876,722 B2 * | 1/2011 | Hodson et al. | 370/328 |
| 7,889,747 B2 * | 2/2011 | Hodson et al. | 370/401 |
| 7,965,664 B2 * | 6/2011 | Hodson et al. | 370/310 |
| 2002/0120671 A1 * | 8/2002 | Daffner et al. | 709/201 |
| 2002/0122230 A1 | 9/2002 | Izadpanah et al. | |
| 2003/0023795 A1 * | 1/2003 | Packwood et al. | 710/105 |
| 2004/0107009 A1 * | 6/2004 | Fehrer et al. | 700/2 |
| 2004/0196844 A1 | 10/2004 | Hagino | |
| 2004/0230899 A1 * | 11/2004 | Pagnano et al. | 715/513 |
| 2004/0259533 A1 | 12/2004 | Nixon et al. | |
| 2005/0141553 A1 | 6/2005 | Kim et al. | |
| 2005/0228509 A1 * | 10/2005 | James | 700/19 |
| 2007/0067458 A1 * | 3/2007 | Chand | 709/226 |
| 2007/0153677 A1 | 7/2007 | McLaughlin et al. | |
| 2007/0237137 A1 | 10/2007 | McLaughlin | |
| 2007/0280144 A1 * | 12/2007 | Hodson et al. | 370/312 |
| 2007/0280178 A1 * | 12/2007 | Hodson et al. | 370/338 |
| 2007/0280286 A1 * | 12/2007 | Hodson et al. | 370/466 |
| 2007/0280287 A1 * | 12/2007 | Samudrala et al. | 370/466 |
| 2007/0282463 A1 * | 12/2007 | Hodson et al. | 700/20 |

FOREIGN PATENT DOCUMENTS

DE    103 14 721 A1    11/2004

(Continued)

OTHER PUBLICATIONS

Jasperneite et al., "PROFINET: An Integration Platform for heterogeneous Industrial Communication Systems", © 2005 IEEE, retrieved from <http://ieeexplore.ieee.org/stamp/stamp.jsp?tp=& arnumber=1612610> pp. 815-822.*

(Continued)

*Primary Examiner* — Don Wong
*Assistant Examiner* — Marina Lee (57) ABSTRACT

A device description language (DDL) converter is provided for converting a first DDL file into one or more second DDL files. The DDL files may be associated with wireless field devices that are or could be used in a process control system, such as wireless sensors or wireless actuators. The DDL files may contain information associated with parameters of the field devices, such as tunings, performance statistics, statuses, measurements, and other data of interest. The first DDL file could be associated with a non-standard DDL. The one or more second DDL files could be associated with standard DDLS, such as HART, Foundation Fieldbus, and Profibus DDLs.

21 Claims, 3 Drawing Sheets

FOREIGN PATENT DOCUMENTS

| | | |
|---|---|---|
| EP | 1 401 171 A2 | 3/2004 |
| EP | 1401171 A2 | 3/2004 |
| GB | 2 427 329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2006/017944 A1 | 2/2006 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

Pereira J. M. D., "A fieldbus prototype for educational purposes", IEEE Instrumentation and Measurement Magazine, vol. 7, No. 1, Mar. 2004, pp. 24-31.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

\* cited by examiner

APPARATUS AND METHOD FOR CONVERTING BETWEEN DEVICE DESCRIPTION LANGUAGES IN A PROCESS CONTROL SYSTEM

CROSS-REFERENCE TO RELATED APPLICATIONS

This application is related to the following concurrently filed U.S. patent applications:

Ser. No. 11/444,043, entitled "APPARATUS AND METHOD FOR INTEGRATING WIRELESS OR OTHER FIELD DEVICES IN A PROCESS CONTROL SYSTEM";

Ser. No. 11/444,200, entitled "APPARATUS AND METHOD FOR INTEGRATING WIRELESS FIELD DEVICES WITH A WIRED PROTOCOL IN A PROCESS CONTROL SYSTEM"; and Ser. No. 11/443,773, entitled "APPARATUS, SYSTEM, AND METHOD FOR INTEGRATING A WIRELESS NETWORK WITH WIRED FIELD DEVICES IN A PROCESS CONTROL SYSTEM";

all of which are hereby incorporated by reference.

TECHNICAL FIELD

This disclosure relates generally to control systems and more specifically to an apparatus and method for converting between device description languages in a process control system.

BACKGROUND

Processing facilities are often managed using process control systems. Example processing facilities include manufacturing plants, chemical plants, crude oil refineries, and ore processing plants. Among other operations, process control systems typically interact with and control various field devices, such as sensors and actuators, in the processing facilities.

Wireless technology provides opportunities for process control systems to reduce instrumentation costs, such as by reducing the costs of installing and using sensors or other field devices in a control system. This reduction may, for example, be useful for less critical process measurements, where the costs of installing and using wired field devices may exceed the benefits provided by those wired field devices.

Field devices may contain dozens or hundreds of parameters, such as tunings, performance statistics, statuses, measurements, and other data of interest. A device description language (DDL) is often used to describe a field device. A device description language typically represents a text-based language that describes the characteristics of field device parameters. The device description language may allow a process control system to access the data of or otherwise interact with a field device. More specifically, the device description language may provide users with a mechanism to integrate, configure, operate, and maintain the field device.

SUMMARY

This disclosure provides an apparatus and method for converting between device description languages in a process control system.

In a first embodiment, a method includes receiving first information associated with one or more parameters of a field device, which is operable to operate in a process control system. The first information is associated with a first device description language. The method also includes converting the first information associated with the first device description language into second information associated with a second device description language. In addition, the method includes providing the second information to facilitate interaction with the field device.

In particular embodiments, the first information includes a first device description language source file. Also, converting the first information into the second information includes (i) parsing the first device description language source file into individual components, (ii) identifying a corresponding component compliant with the second device description language for each individual component from the first device description language source file, and (iii) generating a second device description language source file using the components compliant with the second device description language. In addition, the method includes converting the second device description language source file into a binary file.

In other particular embodiments, the first information includes a first device description language binary file, and converting the first information into the second information includes converting the first device description language binary file into a second device description language binary file.

In a second embodiment, an apparatus includes at least one memory operable to store a first device description language file associated with a field device, which is operable to operate in a process control system. The apparatus also includes at least one processor operable to convert the first device description language file into a second device description language file and store the second device description language file in the at least one memory. The first and second device description language files are associated with different device description languages.

In a third embodiment, a computer program is embodied on a computer readable medium and is operable to be executed by a processor. The computer program includes computer readable program code for receiving first information associated with one or more parameters of a field device, which is operable to operate in a process control system. The first information is associated with a first device description language. The computer program also includes computer readable program code for generating second information associated with a second device description language using the first information. In addition, the computer program includes computer readable program code for outputting the second information to facilitate interaction with the field device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
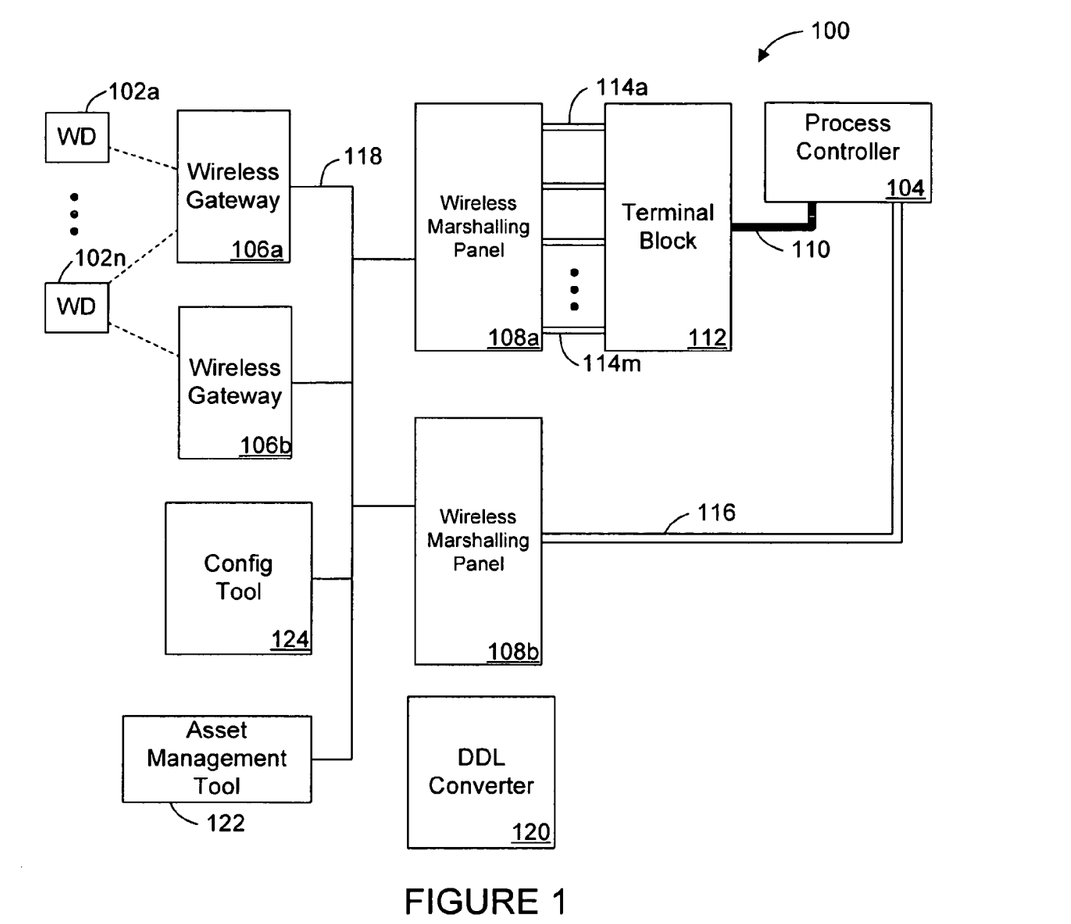
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example, the process control system 100 includes multiple wireless field devices 102a-102n. The wireless field devices 102a-102n represent components in a process or production system that may perform any of a wide variety of functions. For example, the wireless field devices 102a-102n could represent sensors capable of measuring one or more characteristics of a process or production system. The wireless field devices 102a-102n could also represent valves or other actuators capable of performing one or more actions that alter the process or production system. Each of the wireless field devices 102a-102n includes any suitable device or structure for performing one or more functions in a process or production system.

A process controller 104 controls the operation of the wireless field devices 102a-102n. For example, the process controller 104 may be capable of receiving data from one or more of the wireless field devices 102a-102n (such as sensors) and providing control signals to one or more of the wireless field devices 102a-102n (such as actuators). The process controller 104 includes any hardware, software, firmware, or combination thereof for controlling one or more of the wireless field devices 102a-102n.

In this example, the wireless field devices 102a-102n communicate with the process controller 104 through one or more wireless gateways 106a-106b and one or more wireless marshalling panels 108a-108b. Each of the wireless gateways 106a-106b is capable of transmitting information wirelessly to and receiving information wirelessly from the wireless field devices 102a-102n. Each of the wireless gateways 106a-106b includes any device or structure for wirelessly communicating with one or more of the wireless field devices 102a-102n. Each of the wireless gateways 106a-106b could, for example, include one or more radio frequency (RF) transmitters, receivers, or transceivers.

The wireless marshalling panels 108a-108b facilitate communication between the wireless field devices 102a-102n and the process controller 104. For example, the wireless marshalling panels 108a-108b may enable the process controller 104 to communicate with the wireless field devices 102a-102n without requiring the process controller 104 to understand the communication protocol(s) used by the wireless field devices 102a-102n.

As a particular example, the process controller 104 could support the Highway Addressable Remote Transducer (HART) protocol, where signals for field devices are transmitted by the process controller 104 over a multi-conductor cable 110 to a terminal block 112. The terminal block 112 separates the signals for the field devices into wire pairs 114a-114m, where each wire pair is associated with a different field device. In these embodiments, the wireless marshalling panel 108a could convert HART-compliant signals received from the process controller 104 into messages sent to the wireless gateways 106a-106b. The wireless marshalling panel 108a could also convert messages from the wireless gateways 106a-106b into HART-compliant signals sent to the process controller 104. The use of the multi-conductor cable 110 and terminal block 112 with the HART protocol is for illustration only. Any other input/output technique and/or communication network could be used with the HART protocol.

As another particular example, the process controller 104 could support the Foundation Fieldbus (FF) High Speed Ethernet (HSE) protocol, where signals for field devices are transmitted from the process controller 104 over a single wire pair 116. In these embodiments, the wireless marshalling panel 108b may transmit FF HSE-compliant signals to and receive FF HSE-complaint signals from the process controller 104, while at the same time providing data to and receiving data from the wireless gateways 106a-106b using a different protocol.

Each of the wireless marshalling panels 108a-108b could include any device or structure facilitating communication between the wireless field devices 102a-102n (via the gateways 106a-106b) and the process controller 104. Additional details regarding the wireless marshalling panels 108a-108b can be found in U.S. patent application Ser. No. 11/394,947 entitled "APPARATUS, SYSTEM, AND METHOD FOR INTEGRATION OF WIRELESS DEVICES WITH A DISTRIBUTED CONTROL SYSTEM," which is hereby incorporated by reference. The wireless marshalling panels 108a-108b could support the use of any suitable field device protocol(s), such as HART, FF HSE, FF H1, Modbus, Profibus, and WorldFIP. In this document, the phrase "field device protocol" refers to any protocol(s) for communicating with one or more field devices in a control system (whether or not the field devices of the control system actually use that protocol).

A network 118 couples the wireless gateways 106a-106b and the wireless marshalling panels 108a-108b. The network 118 represents any suitable computing or communication network capable of transporting data, such as one or more local area networks (LANs), metropolitan area networks (MANs), wide area networks (WANs), all or a portion of a global network such as the Internet, or any other communication system or systems at one or more locations. As particular examples, the network 118 could represent an RS-485 network or an Ethernet network. The network 118 could also represent a redundant set of networks, such as a pair of Ethernet networks forming a Fault Tolerant Ethernet (FTE) network.

Each of the wireless field devices 102a-102n could have any number of operational parameters, such as tunings, performance statistics, statuses, measurements, and other data of interest. The number of parameters could be rather large, such as dozens, hundreds, or even more. For the process controller 104 to effectively interact with and control the wireless field devices 102a-102n, a device description language (DDL) file for each wireless field device can be defined. The DDL file for a wireless field device typically represents a text-based or other language file that describes the characteristics of a field device, such as the parameters of that field device. The DDL files for field devices are often generated by the manufacturers of those field devices.

Some, many, or all of the DDL files associated with the field devices 102a-102n could be generated using proprietary, non-standard, or undesirable languages. As shown in FIG. 1, a DDL converter 120 is capable of converting DDL files associated with the wireless field devices 102a-102n into standard, accepted, widely utilized, or specified DDL files. As an example, a wireless field device 102a could represent a field device using the WIRELESS NETWORK FOR SECURE INDUSTRIAL APPLICATION (WNSIA) protocol from HONEYWELL INTERNATIONAL INC., and the wireless field device 102a could have an associated WNSIA DDL file. The WNSIA DDL file may use or be associated with a non-standard language in the control system 100 (although the WNSIA DDL could represent a standard or desired DDL in a control system). A WNSIA DDL file is generally structured for use with a FF tokenizer, although the WNSIA DDL file defines non-standard FF objects. The DDL converter 120 could convert the WNSIA DDL file into a HART DDL file, a FF DDL file, a Profibus DDL or GSD file, or some other DDL file. The newly-generated DDL file may then be compiled using a tokenizer or other program, which compiles the DDL file into binary form for later interpretation or execution. The HART, FF, Profibus, or other DDL files generated by the DDL converter 120 may be referred to as "converted DDL files." The WNSIA or other DDL files being converted by the DDL converter 120 may be referred to as "original DDL files." In other embodiments, the DDL converter 120 could operate directly on binary files, such as by converting WNSIA DDL binary files to binary files compliant with other protocols.

In this way, a suitable DDL file for each field device may be available for use in the process control system 100. For example, converted DDL files could be used in the process control system 100 to ensure that the process controller 104 is able to receive data from, send data to, and control the operation of the field devices 102a-102n.

The converted DDL files could also be used to ensure that an asset management tool 122 can interact with the wireless field devices 102a-102n. The asset management tool 122 could, for example, represent an application executed by a computing device that is coupled to the wireless marshalling panels 108a-108b by serial links (such as RS-485 links). As a particular example, by converting a non-standard DDL file into a standard DDL file using the DDL converter 120, the asset management tool 122 may be capable of communicating with and tracking or managing a field device associated with the non-standard DDL file.

In addition, a configuration tool 124 could use the converted DDL files produced by the DDL converter 120. The configuration tool 124 may represent a tool used to provide configuration information to the wireless field devices 102a-102n, the wireless gateways 106a-106b, the process controller 104, or any other suitable component of the process control system 100. The configuration information may be based on or derived from the converted DDL files produced by the DDL converter 120. For example, the configuration information could be used by the gateways 106a-106b to control the conversion of data from the wireless field devices 102a-102n into messages or signals transmitted towards the process controller 104. Similarly, the configuration information could be used by the gateways 106a-106b to control the conversion of data from the process controller 104 into messages or signals transmitted to the wireless field devices 102a-102n. As a particular example, by converting a non-standard DDL file into a standard DDL file using the DDL converter 120, a user of the configuration tool 124 may be able to more easily provide the configuration information to the wireless gateways 106a-106b.

The conversion of DDL files (such as from one format or protocol to another) may support any other or additional functionality in the system 100. In this document, the phrases "device description language" and "DDL" refer to any text-based or other language that describes the characteristics of one or more field device parameters, including known or to-be-developed standard, proprietary, or other DDLs, electronic DDLs (EDDLs), or other files. The DDL converter 120 includes any hardware, software, firmware, or combination thereof for converting information associated with one DDL to information associated with a different DDL.

While shown as forming part of the process control system 100, the DDL converter 120 need not reside in a process control system 100. For example, the DDL converter 120 could be used by a manufacturer that produces field devices (such as wireless sensors or actuators) for process control systems. As a particular example, a wireless sensor manufacturer could produce a WNSIA DDL source file for a field device, which would allow the field device to operate in a WNSIA wireless network. The wireless sensor manufacturer, working with a provider of a wireless gateway, could use the DDL converter 120 to convert the WNSIA source DDL file into a binary form suitable for use with the wireless gateway. The WNSIA binary DDL file could then be sold, along with a wireless sensor or actuator, to a corporation or other entity who wishes to use the field device in a process control system. A control system engineer or other personnel could load the WNSIA binary DDL file into a process control system so the field device can communicate with a wireless gateway. While this represents one specific example of how the DDL converter 120 could be used separate from a process control system 100, the DDL converter 120 could be used in any other suitable manner.

Although FIG. 1 illustrates one example of a process control system 100, various changes may be made to FIG. 1. For example, a control system could include any number of field devices (including wired and/or wireless field devices), controllers, gateways, wireless marshalling panels, terminal blocks, tools, and DDL converters. Also, while FIG. 1 illustrates two types of connections between the wireless marshalling panels 108a-108b and the process controller 104, the system 100 could include any number and type of connections. Further, FIG. 1 illustrates one functional division between components in the system 100. However, various components in FIG. 1 could be combined or further subdivided, such as by combining the asset management tool 122 and the configuration tool 124 into a single physical unit. Various components could also be omitted from the system 100 if their functionality is not desired or required in a particular implementation. In addition, FIG. 1 illustrates one operational environment in which DDL conversion can be used. The DDL converter 120 or its associated functionality could be used in any other suitable device or system.

Figure 2:
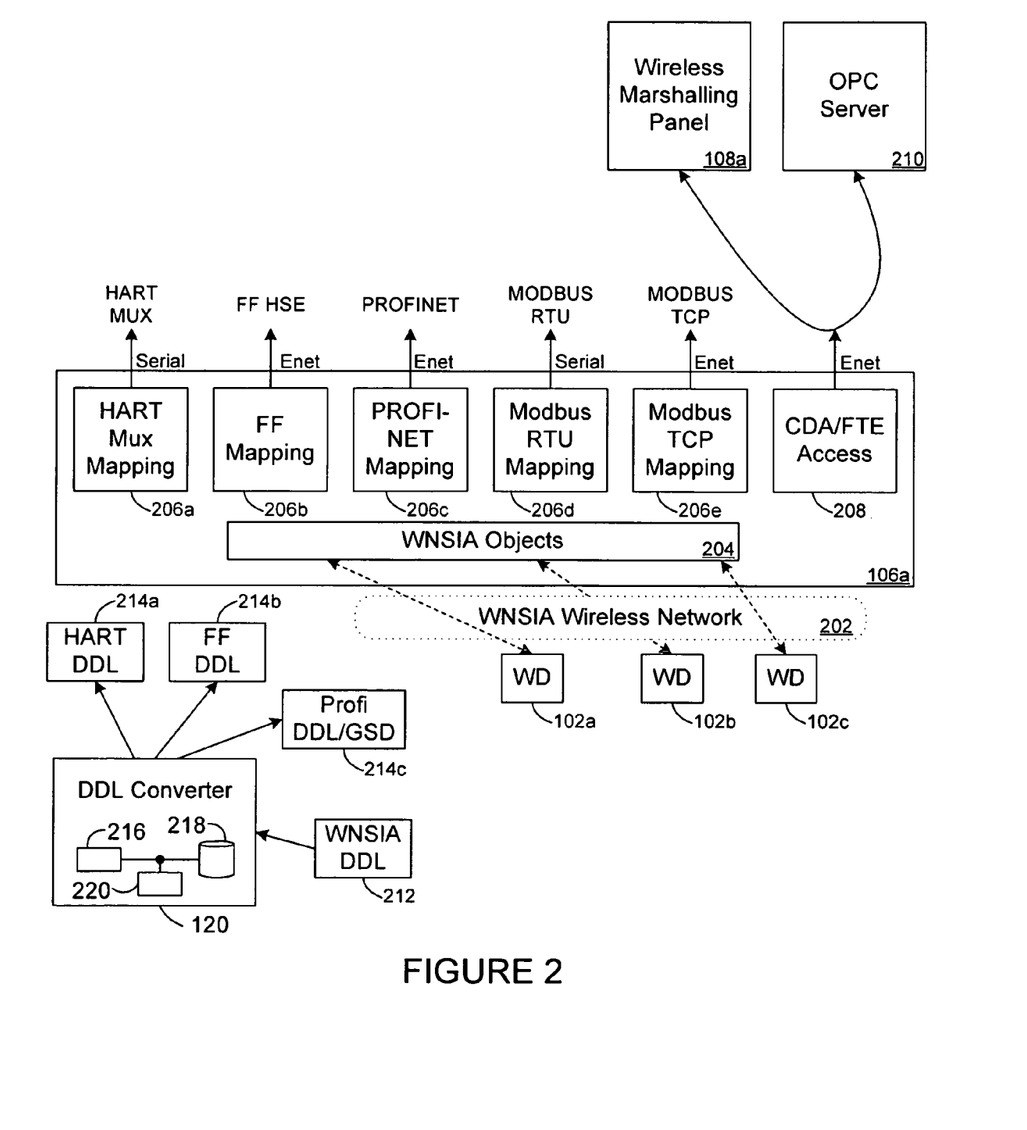
FIG. 2 illustrates additional details of an example process control system according to one embodiment of this disclosure.

FIG. 2 illustrates additional details of an example process control system 100 according to one embodiment of this disclosure. In particular, FIG. 2 illustrates additional details regarding the arrangement and operation of the wireless gateway 106a and the DDL converter 120. The additional details shown in FIG. 2 are for illustration only. The process control system 100 could have other wireless gateways or DDL converters without departing from the scope of this disclosure. Also, for ease of explanation, the wireless gateway 106a and the DDL converter 120 are described as operating in the process control system 100 of FIG. 1. The wireless gateway 106a and the DDL converter 120 could be used in any other suitable system.

In this example, three wireless field devices 102a-102c represent WNSIA field devices that communicate with the wireless gateway 106a over a WNSIA wireless network 202. This indicates that the wireless field devices 102a-102c and the wireless gateway 106a communicate using a WNSIA wireless protocol. The WNSIA wireless network 202 could represent any suitable network, such as a 56 Mbps 802.11 wireless network.

As shown in FIG. 2, the wireless gateway 106a includes WNSIA objects 204. The WNSIA objects 204 generally represent a wireless application model, which defines how wireless communication with the field devices 102a-102c occurs. For example, the WNSIA objects 204 could define the messages that are used to transmit data to the wireless field devices 102a-102c. The WNSIA objects 204 could also define the messages containing data that are received from the wireless field devices 102a-102c, allowing relevant data to be extracted from the received messages. Although shown as using WNSIA objects 204 to support a WNSIA wireless network 202, the wireless gateway 106a could support any other or additional type(s) of wireless network for communication with the wireless field devices 102a-102c.

The wireless gateway 106a also includes various mappings 206a-206e. The mappings 206a-206e map the wireless application model (of the wireless network 202) to application models of standard, desired, or other field device protocols. In other words, the mappings 206a-206e define how data from the wireless field devices 102a-102c can be converted into other field device protocols, and vice versa. For example, a HART multiplexer mapping 206a defines how data from the wireless field devices 102a-102c can be converted into a serial HART-compliant data stream (as if the gateway 106a was a HART multiplexer). The HART multiplexer mapping 206a also defines how data in a serial HART-compliant data stream can be extracted for transmission to the wireless field devices 102a-102c. The mappings 206b-206c represent similar mappings used with the FF HSE and Profibus protocols, respectively. The mappings 206d-206e represent similar mappings used with the Modbus Remote Terminal Unit (RTU) protocol and the Modbus Transmission Control Protocol (TCP), respectively.

In addition to the mappings 206a-206e, the gateway 106a includes a Control Data Access (CDA) or Fault Tolerant Ethernet (FTE) access module 208. The CDA/FTE access module 208 supports access to other components in the process control system 100, such as the wireless marshalling panel(s) or an OLE Process Control (OPC) server 210. The CDA/FTE access module 208 could operate in a similar manner as the mappings 206a-206e, such as by formatting data for transmission from the gateway 106a and extracting data from messages received by the gateway 106a. While shown as providing access to a wireless marshalling panel and an OPC server 210, this or any other access module 208 could provide access to these or any other or additional components in the process control system 100.

In order to properly communicate or interact with the wireless field devices 102a-102c, a DDL file for each wireless field device may be used. If one or more of the DDL files use an undesired or unexpected format or protocol, the DDL converter 120 may convert the DDL file(s) into a standard, desired, expected, or specified format or protocol. For example, the DDL converter 120 could receive a WNSIA DDL file 212, which may be associated with one or more of the wireless field devices 102a-102c. The DDL converter 120 could examine the WNSIA DDL file 212, break the WNSIA DDL file 212 down into its components, and reconstruct the components into one or more converted DDL files 214a-214c. The converted DDL files 214a-214c represent DDL files containing the logic or content of the original DDL file 212 expressed in a different format or protocol. In this example, the DDL converter 120 converts the WNSIA DDL file 212 into one or more of a HART DDL file 214a, a FF DDL file 214b, and a Profibus DDL or GSD file 214c. This is for illustration only. The DDL converter 120 could convert any suitable DDL file 212 into any suitable converted DDL file or files 214a-214c.

In this example, the DDL converter 120 includes one or more processors 216 and one or more memories 218 storing data and instructions used by the processor(s) 216 (such as software for converting DDL files). Also, the DDL converter 120 includes at least one interface 220, which may allow the DDL converter 120 to communicate with other components of the process control system 100. The interface 220 could represent any suitable interface, such as an Ethernet interface.

Figure 3:
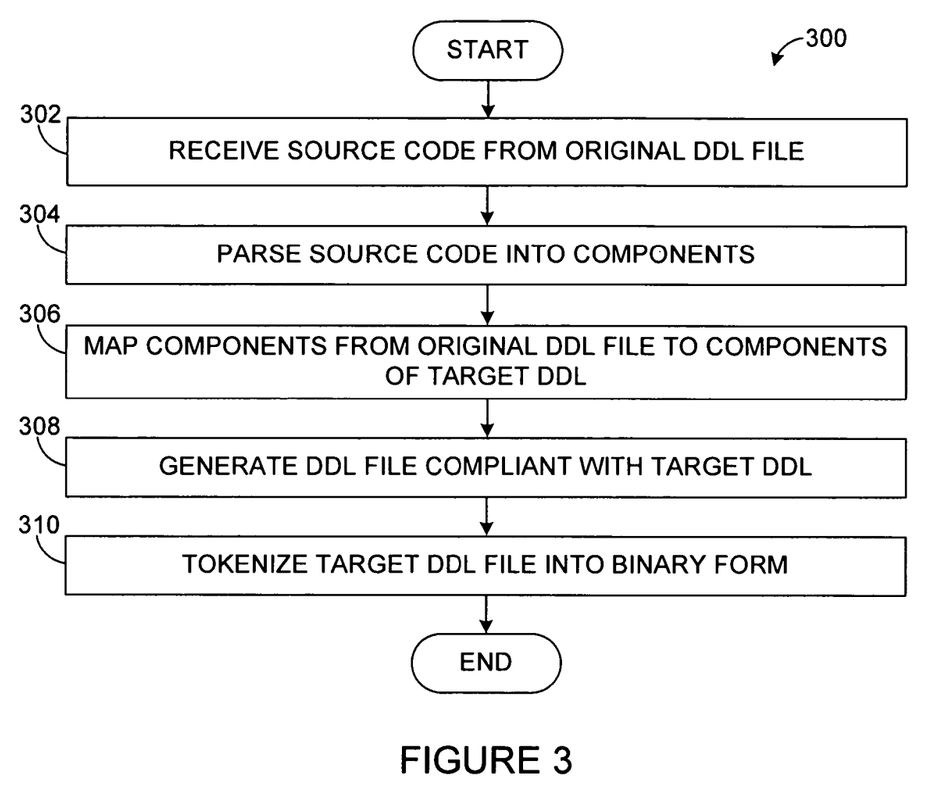
FIG. 3 illustrates an example method for converting between device description languages in a process control system according to one embodiment of this disclosure.

Additional details regarding the conversion of DDL files by the DDL converter 120 are shown in FIG. 3, which is described below.

The following represents specific details regarding the WNSIA DDL file 212 shown in FIG. 2. This represents additional details regarding one specific implementation of the system 100. Other systems could be used without departing from the scope of this disclosure. Also, modifications to the WNSIA protocol are contemplated and within the scope of this disclosure.

The WNSIA DDL is based on the FF DDL, so users may develop WNSIA DDL files 212 using the FF tokenizer toolkit and the FF standard DD library toolkit from the Fieldbus Foundation. Users may develop devices (such as the gateway 106a) that communicate with WNSIA field devices using the FF DD services toolkit from the Fieldbus Foundation.

In particular embodiments, WNSIA DDL files 212 may include a subset of the DDL constructs defined in the FF DDL specification (such as Specification FF-900, which is hereby incorporated by reference). For example, the DDL constructs that may be used in WNSIA DDL files 212 could include the BLOCK, VARIABLE, MENU, EDIT-DISPLAY, METHOD, RELATION, UNIT, REFRESH, WRITE-AS-ONE, ITEM-ARRAY, COLLECTION, RECORD, ARRAY, RESPONSE CODE, LIKE keyword, EXPRESSION, and possibly CONDITIONAL constructs. As another example, the DDL constructs that may not be used in WNSIA DDL files 212 could include the PROGRAM, DOMAIN, VARIABLE LIST, OPEN/CLOSE keywords, and possibly CONDITIONAL constructs.

To facilitate the generation of WNSIA DDL files 212 by vendors, manufacturers, or other entities associated with wireless field devices, standard wireless DD files could be made available or provided to the entities. These standard DD files could be provided for each transducer block type (analog input, analog output, digital input, digital output), and the standard files may be imported into WNSIA DDL source files. The vendors, manufacturers, or other entities could add their own device-specific parameters to the standard DD files, such as by using the ADD, DELETE, and REDEFINE DDL constructs to add, delete, or modify the attributes of a block. The vendors, manufacturers, or other entities could be prevented from deleting any of the standard or required attributes of the imported standard DD files (although they could be redefined using the REDEFINE construct). The Foundation Fieldbus Specification FF-901 (which is hereby incorporated by reference) provides additional information about these constructs and their attributes.

DD developers could rely on a set of specifications, tools, and standard files to produce WNSIA DDL files 212. The standard specifications may include the FF DDL source language specification, which specifies a structured text language used to define the meaning and relationships between available wireless device data. It also specifies the syntax of the language used in WNSIA DDL source files. Another standard specification is the FF DDL binary encoding specification, which specifies a standard encoding of DDL source files into a binary file format. Device specifications could also be used, where the device specifications are used to customize standard wireless DDL files and produce vendor-, manufacturer-, or other entity-specific DDL files for given device types. Once created, DDL source files may be tokenized into binary format and delivered to a host system, which uses FF DD services libraries to interpret information contained in the binary WNSIA DDL files.

Although FIG. 2 illustrates additional details of one example embodiment of a process control system 100, various changes may be made to FIG. 2. For example, the gateway 106a could support any other or additional wireless protocol(s) and any other or additional mapping(s) or access module(s). Also, the DDL converter 120 may be capable of converting DDL files from any other or additional format or protocol into any other or additional format or protocol. In addition, as described above, the DDL converter 120 could be used separate from the process control system 100, where the output of the DDL converter 120 (the new DDL files) could be provided for use in the process control system 100.

FIG. 3 illustrates an example method 300 for converting between device description languages in a process control system according to one embodiment of this disclosure. For ease of explanation, the method 300 of FIG. 3 is described with respect to the DDL converter 120 operating in the process control system 100 of FIG. 1. The method 300 could be used by any other suitable device and in any other suitable system.

The DDL converter 120 receives source code from an original DDL file at step 302. This may include, for example, the DDL converter 120 receiving the source code from a WNSIA DDL file 212. The source code could define any suitable information about a wireless field device, such as objects identifying how data from sensor readings are obtained from the wireless field device or how control signals are provided to the wireless field device.

The DDL converter 120 parses the source code into individual components at step 304. This may include, for example, the DDL converter 120 parsing the source code into individual objects. Each object could represent a different input or output of the wireless field device.

The DDL converter 120 maps the components from the original DDL file to components of a target DDL at step 306. As a particular example, an object from the original DDL file may define how a wireless field device (a sensor) is instructed to measure an analog input. The DDL converter 120 may map this object to a HART command to read a process variable, a FF analog input (AI) function block, or a Profibus message containing an index value representing the analog input.

The DDL converter 120 generates a DDL file compliant with the target DDL at step 308. This may include, for example, the DDL converter 120 using the mappings of the components in the original DDL file to components in the target DDL. The DDL converter 120 could take an original component, extract the necessary data from that component, and generate a new component using the extracted data (where the new component is compliant with the target DDL). At the conclusion of this step, the DDL converter 120 has generated a new DDL file compliant with the target DDL, such as a HART DDL file 214a, a FF DDL file 214b, or a Profibus DDL or GSD file 214c.

The new DDL file is tokenized into binary form at step 310. This may be done by any suitable component, such as a tokenizer. The tokenizer could output the tokenized DDL file for use in the process control system 100. The DDL converter 120 could make the text-based DDL file available to the tokenizer only or to any other or additional destination.

Although FIG. 3 illustrates one example of a method 300 for converting between device description languages in a process control system, various changes may be made to FIG. 3. For example, although shown as generating one new DDL file using one target DDL, the DDL converter 120 could generate multiple new DDL files using multiple target DDLs. Also, although shown as a series of steps, various steps in FIG. 3 could occur in parallel or at least partially overlap. Further, while shown as converting source DDL files from one protocol to another, the DDL converter 120 could convert binary DDL files from one protocol to another. In addition, as described above, the DDL converter 120 could be used separate from the process control system 100.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
 receiving first information describing characteristics of one or more parameters of a field device, the field device operable to operate in a process control system, the characteristics described in the first information using a first device description language, the first information associated with a first communication protocol, the first information comprising a first device description language source file;
 converting the first information into second information describing the characteristics of the one or more parameters of the field device, the characteristics described in the second information using a second device description language, the second information associated with a second communication protocol; and
 providing the second information to facilitate interaction with the field device;

wherein converting the first information into the second information comprises:
parsing the first device description language source file into individual first components;
mapping each first component from the first device description language source file to a corresponding second component of a target file that is compliant with the second device description language; and
generating the target file using the component mappings by (i) taking each first component, (ii) extracting data from that first component, and (iii) generating the corresponding second component using the extracted data, wherein each second component is compliant with the second device description language.

2. The method of claim 1, wherein the first information comprises a Wireless Network for Secure Industrial Application (WNSIA) DDL file and the second information comprises a Highway Addressable Remote Transducer (HART) DDL file.

3. The method of claim 1, wherein converting the first information into the second information further comprises:
generating a second device description language source file comprising the second components of the target file.

4. The method of claim 3, further comprising:
converting the second device description language source file into a binary file.

5. The method of claim 1, wherein:
the first information comprises a first device description language binary file; and
converting the first information into the second information comprises converting the first device description language binary file into a second device description language binary file.

6. The method of claim 1, wherein the field device comprises at least one of: a wireless sensor and a wireless actuator.

7. The method of claim 1, wherein the second device description language comprises one of: a Highway Addressable Remote Transducer device description language, a Foundation Fieldbus device description language, and a Profibus device description language.

8. The method of claim 1, wherein the one or more parameters comprise at least one of: a tuning associated with the field device, a performance statistic associated with the field device, a status associated with the field device, and a measurement taken by the field device.

9. The method of claim 1, wherein providing the second information comprises providing the second information to facilitate interaction between the field device and at least one of: a process controller, an asset management tool, and a configuration tool.

10. The method of claim 1, further comprising:
providing the first information to facilitate communication between the field device and an intermediate device using the first communication protocol; and
providing the second information to facilitate communication between the intermediate device and the process control system using the second communication protocol.

11. An apparatus, comprising:
at least one memory operable to store a first device description language source file associated with a field device, the field device operable to operate in a process control system, the first device description language source file describing characteristics of one or more parameters of the field device using a first device description language; and
at least one processor operable to:
convert the first device description language source file into a second device description language source file, the first and second device description language source files associated with different device description languages, the second device description language source file describing the characteristics of the one or more parameters of the field device using a second device description language; and
store the second device description language source file in the at least one memory;
wherein the at least one processor is operable to convert the first information into the second information by:
parsing the first device description language source file into individual first components;
mapping each first component from the first device description language source file to a corresponding second component of a target file that is compliant with the second device description language; and
generating the target file using the component mappings by (i) taking each first component, (ii) extracting data from that first component, and (iii) generating the corresponding second component using the extracted data, wherein each second component is compliant with the second device description language; and
wherein the first device description language source file is associated with a first communication protocol and the second device description language source file is associated with a second communication protocol.

12. The apparatus of claim 11, wherein the first device description language source file comprises a Wireless Network for Secure Industrial Application (WNSIA) DDL file and the second device description language source file comprises a Highway Addressable Remote Transducer (HART) DDL file.

13. The apparatus of claim 11, wherein the at least one processor is operable to convert the first device description language source file into the second device description language source file further by:
generating the second device description language source file comprising the second components of the target file.

14. The apparatus of claim 13, wherein the at least one processor is further operable to:
convert the second device description language source file into a binary file.

15. The apparatus of claim 11, wherein the field device comprises a wireless field device.

16. The apparatus of claim 11, wherein the device description language associated with the second device description language source file comprises one of: a Highway Addressable Remote Transducer device description language, a Foundation Fieldbus device description language, and a Profibus device description language.

17. The apparatus of claim 11, wherein the one or more parameters comprise at least one of: a tuning associated with the field device, a performance statistic associated with the field device, a status associated with the field device, and a measurement made by the field device.

18. A non-transitory computer readable medium embodying a computer program, the computer program comprising computer readable program code for:
receiving first information describing characteristics of one or more parameters of a field device, the field device operable to operate in a process control system, the characteristics described using a first device description language, the first information comprising a first device description language source file;

generating second information describing the characteristics of the one or more parameters of the field device using a second device description language, the second information generated using the first information; and outputting the second information to facilitate interaction with the field device;

wherein the first information is associated with a first communication protocol and the second information is associated with a second communication protocol; and wherein generating the second information comprises:

parsing the first device description language source file into individual first components;

mapping each first component from the first device description language source file to a corresponding second component of a target file that is compliant with the second device description language; and generating the target file using the component mappings by (i) taking each first component, (ii) extracting data from that first component, and (iii) generating the corresponding second component using the extracted data, wherein each second component is compliant with the second device description language.

19. The computer readable medium of claim 18, wherein the first information comprises a Wireless Network for Secure Industrial Application (WNSIA) DDL file and the second information comprises a Highway Addressable Remote Transducer (HART) DDL file.

20. The computer readable medium of claim 18, wherein the computer readable program code for generating the second information further comprises computer readable program code for:

generating a second device description language source file comprising the second components of the target file.

21. The computer readable medium of claim 20, further comprising computer readable program code for converting the second device description language source file into a binary file.

* * * * *